J. J. BATE.

REFRIGERATING PROVISION-CARS.

No. 6,943. Reissued Feb. 22, 1876.

*Witnesses:*
H Wells Jr.
Elbert Dearborn

*Inventor:*
John J Bate
per James A Whitney
Atty

UNITED STATES PATENT OFFICE.

JOHN J. BATE, OF BROOKLYN, NEW YORK, ASSIGNOR TO THE BATE REFRIGERATING COMPANY, OF NEW YORK CITY.

IMPROVEMENT IN REFRIGERATING PROVISION-CARS.

Specification forming part of Letters Patent No. 123,078, dated January 30, 1872; antedated January 15, 1872; reissue No. 6,943, dated February 22, 1876; application filed August 17, 1875.

*To all whom it may concern:*

Be it known that I, JOHN J. BATE, of the city of Brooklyn, in the State of New York, have invented certain Improvements in Refrigerating Provision-Cars, of which the following is a specification:

This invention has reference to an arrangement of means for drawing the air from the provision-chamber near its top, and delivering it cooled and purified at the bottom of the chamber. It comprises a coiled tube arranged within the ice-box of a closed refrigerating-chamber, in combination with a fan-blower arranged at the outlet of the said pipe, and having its own outlet at or near the floor of the chamber, whereby the air drawn downward by suction through the coiled tube is cooled thereby, and finally forcibly ejected to the lower part of the chamber, the air being thus kept at a low temperature, more or less proportioned to the speed and capacity of the fan-blower. The invention further comprises a novel combination of the upper and lower openings of the ice-box with the coiled pipe within the latter, whereby, when the fan-blower is at rest, the circulation of the air of the chamber may be arrested from the coiled tube, and caused to pass, by changes in its temperature, through the ice instead, thereby preventing absolute inoperation of the apparatus from stoppage in the use or operation of the pipe. The invention further comprises a novel combination of parts, whereby the most effective operation of the invention is secured.

Figure 1:
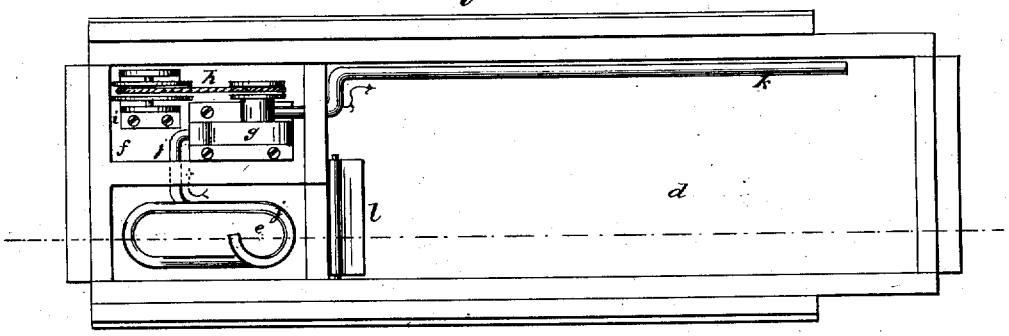
Figure 2:
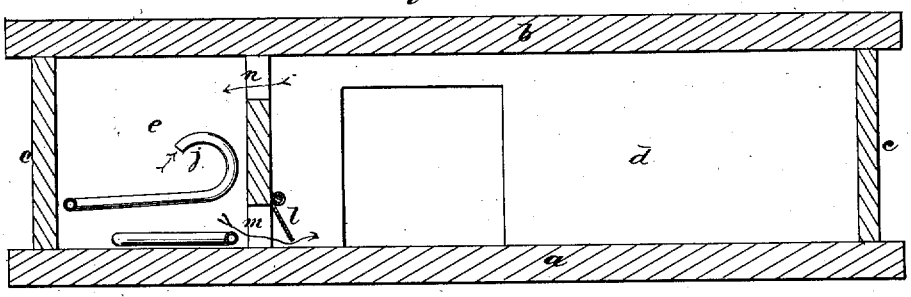

The accompanying drawing shows a car, of which *a* indicates the floor, *b* the roof, and *c* the ends. In Figure 1 (a horizontal section) the roof is removed to show the interior of the car, and Fig. 2 is a view, by vertical section, on the dotted line of Fig. 1. *d* indicates the provision-chamber; *e*, the ice-chamber; *f*, the messenger's room. In the messenger's room, or in the ice-box, is placed a fan-blower, *g*, which is operated by a band or cord, *h*, passing around a pulley on its shaft, and around a pulley, *i*, which is operated by a band from and around the axle of the car. To the inlet of the blower is attached a tube, *j*, and to the outlet another tube, *k*. The tube *j* is coiled in the ice-box, as is shown by Fig. 2. The tube *k* lies upon the floor of the car, and can be perforated for the escape of the air; or the only escape-opening may be at the end of the tube. A hinged door, *l*, is at the bottom of the partition, between the ice-box and the provision-chamber, to control the opening *m*. When the blower is not in action the door *l* will be left open, so that there will be a circulation of air from the provision-chamber through the openings *m* and *n*, provided, respectively, one at or near the top, and one at or near the bottom, of the ice-box. When the blower is in operation and the door *l* closed, the air from the provision-chamber will be drawn through the space *n*, and through the upper portion of the ice-box, to the mouth of the tube *j*, passing through the blower and through the tube *k*, and be delivered at the bottom of the provision-chamber. This arrangement of means is intended to use the air of chamber over and over again, and thus keep the air cool and pure.

For store-rooms or warehouses, or provision-chambers in buildings, such motive as is at hand may be used to operate the blower. In some cases I prefer to use watch or clock movements.

In the bottom of the ice-chamber there will be the usual drip or siphon for drawing off the water therefrom.

What I claim as my invention is—

1. The coiled tube arranged within the ice-box of the refrigerating-chamber, closed against access of external air, in combination with a fan-blower arranged at its outlet, and having its own outlet at or near the floor of the chamber, substantially as and for the purpose specified.

2. The combination of the upper and lower openings of the ice-box with the coiled tube provided with the blower, substantially as and for the purpose specified.

3. The arrangement of the coiled tube *j* in the ice-chamber in relation to the opening *n*, fan-blower *g*, and tube *k*, for drawing the air from the upper part of the provision-chamber, and delivering it near the bottom thereof, as herein recited.

JOHN J. BATE.

Witnesses:

H. WELLS, Jr.,

ELBERT DEARBOEN.